Jan. 1, 1957     F. SCHMITZ     2,776,105
SHUT-OFF GATE VALVE
Filed Jan. 27, 1953
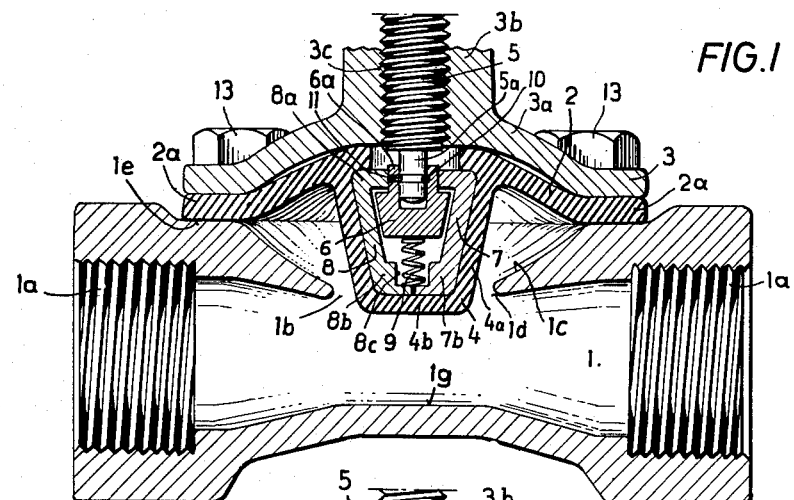
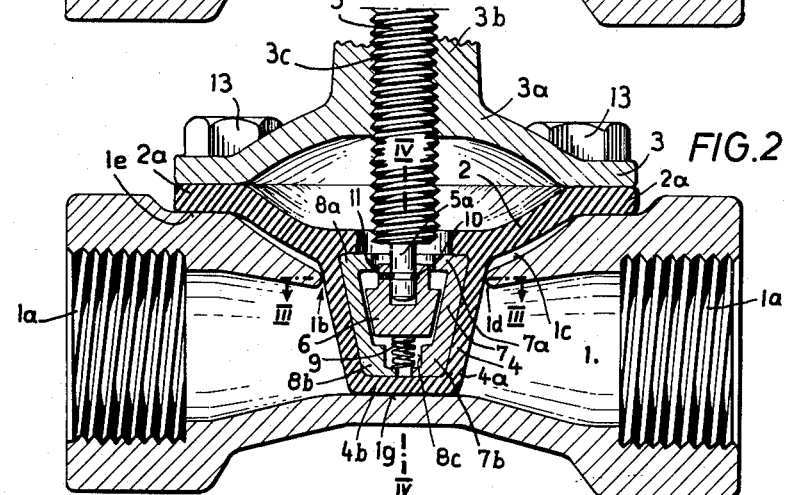
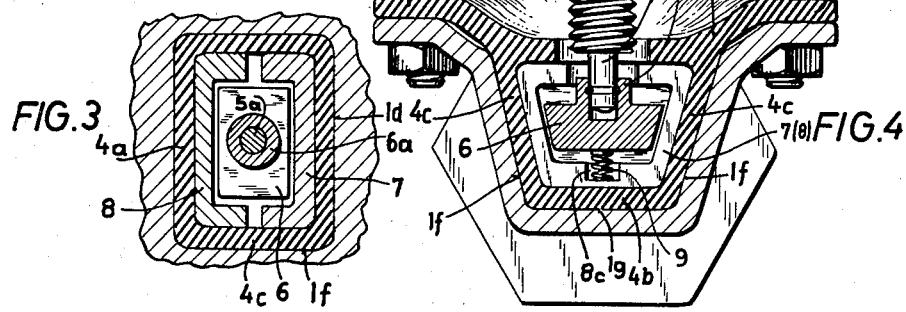
INVENTOR.
F. Schmitz
BY
Bryant & Lowry
ATTYS.

2,776,105

SHUT-OFF GATE VALVE

Friedrich Schmitz, Koln-Sulz, Germany

Application January 27, 1953, Serial No. 333,422

3 Claims. (Cl. 251—199)

This invention relates to gate valves and has special reference to a gate valve construction in which a stuffing box is unnecessary and wherein the gate member proper is of the diaphragm type.

One important object of the invention is to provide a valve of this character wherein the valve member proper is expansible and, when closed, fits properly on a flat valve seat.

Another important object of the invention is to provide a valve of this character having a compressible flange acting as a gasket and preventing a leak between the valve body and valve cap.

A further important object of the invention is to provide a valve of this kind wherein the closure gate is expansible laterally at right angles to the flow of water or the like through the valve body.

A still further important object of the invention is to construct the gate member of the valve of expansible material having a rigid but expansible interior reinforcing.

Yet a further important object of the invention is to provide novel means for expanding the gate member proper.

With the above and other objects in view that will become apparent as the nature of the invention is better understood, the same consists in the novel, form, combinations of parts hereinafter more fully described, illustrated in the accompanying drawings, and particularly claimed.

In the drawings:

Fig. 1 is a vertical longitudinal section through a valve constructed in accordance with this invention with the valve shown in its open position, Fig. 2 is a sectional view similar to Fig. 1, showing the valve in its lowered closed position, Fig. 3 is a horizontal detail sectional view taken on line III—III of Fig. 2, and Fig. 4 is a vertical detail sectional view taken on line IV—IV of Fig. 2.

In the construction of this invention there is provided a valve body indicated in general at 1. This valve body is provided at each end with internally threaded pipe connections 1$^a$ and at its center is of substantially the same area in cross section as the internal area of a pipe screwed into one of the ends 1$^a$. The valve body has at its top an opening 1$^b$ and the outer surface of the body curves upwardly and outwardly from the opening as at 1$^c$. The edges of this opening at the front and rear are rounded as at 1$^d$. Extending around the curved portion 1$^c$ is a flat or planar seat 1$^e$. The valve body directly beneath the opening 1$^b$ has a flat seat 1$^g$.

The valve proper includes a diaphragm indicated in general at 2 and is provided with a peripheral flange 2$^a$ shaped to conform to the shape and size of the seat 1$^e$. The flange 2$^a$ normally is seated on the seat 1$^e$ and is held compressed against this seat by a flange 3 formed on a cap 3$^a$ arching upwardly on its underside from the flange 3. This cap is provided with an upwardly extending boss or hub 3$^b$ which is internally threaded as at 3$^c$ for the accommodation of a spindle 5.

The diaphragm 2 of the valve proper has a downwardly extending gate indicated in general at 4 and this gate is of truncated pyramidal shape and is provided with converging portions 4$^a$ integral with the diaphragm 2. The portions 4$^a$ are connected at their lower ends by an integral transverse flat portion 4$^b$. As thus constructed, as will be seen from Fig. 2, the gate proper 4 is rectangular in cross-section and is of general wedge shape and in the form of a truncated pyramid. Within each of the inlined side portions of the gate 4 is a pair of liners 7 and 8, each of which respectively has an inwardly extending upper flange 7$^a$ and 8$^a$ and an inwardly extending lower flange 7$^b$ and 8$^b$. The flange portions 7$^b$ and 8$^b$ are cut away centrally to provide a spring seat or pocket 8$^c$. Between the liners 7 and 8 is fitted a wedge-shaped member 6 having an upstanding boss 6$^a$ for the reception of a pin 5$^a$ extending integrally downwardly from the spindle 5. This pin is provided with a circumferential groove 10 and a snap ring 11 fits in this groove to lock the pin with the wedge-shaped member 6. Between the wedge-shaped member and the spring seat 8$^c$ is located a coiled compression spring 9, which urges the member 6 upwardly at all times. The side portions of the gate fit between parallel side walls formed on the interior of the body 1. Also, it is to be noted that these side portions form corresponding sides of the opening 1$^b$. The cap member is held to the body 1 by any preferred means, such as the bolts 13.

In operation, when the spindle 5 is rotated to relieve pressure on the underside of the diaphragm formed between the flange 2$^a$ and the upper part of the gate, the pressure will assist in lifting this part of the diaphragm and thus carry the gate upward until the diaphragm conforms to the upwardly curved parts of the cap. At this time, the valve will be fully opened. When it is desired to close the valve, the spindle is rotated in the opposite direction and will push the diaphragm downwardly until the lower flat end portion 4$^b$ of the gate proper contacts the flat surface 1$^g$ and flattens out. At the same time, the liners 7 and 8 will be forced apart by the wedge member and the opening 1$^b$ will be tightly closed.

Under this construction, the valve is entirely different from those types of diaphragm valve in which a diaphragm is bulged downwardly into contact with a seat and can only conform to such a seat by expansion pressure causing deformation of the usual flat or hollow diaphragm. The invention also differs markedly from the old types of gate valves wherein it is necessary to provide a bonnet or stuffing box to prevent leakage, the leakage in the present invention being prevented by the clamping of the flange parts 2$^a$ of the diaphragm 2 between the planar surface 1$^e$ and the flange 3 of the cap. Furthermore, the wedging action forces the side portions of the gate member outwardly until the opening 1$^b$ is tightly closed.

What is claimed as new is:

1. A gate valve construction including a body having a passage extending from end to end on a rectilinear axis and also having an opening at its top, a flexible and freely compressible diaphragm extending over said top opening and having a peripheral flange portion resting on the exterior of the body around said opening, securing means for said ange portion, an expansible hollow truncated pyramidal wedge-shaped gate portion having a flat bottom and depending from said diaphragm and movable through said opening, said gate portion having rigid internal liners pressing against the inclined sides of said gate portion, spreading means for said liners, said body having internal faces engaged by said gate portion upon closure of the valve, one of said faces being flat for engagement by the flat bottom of the gate portion, and operating means to move said gate portion between open and closed positions of the valve and for operating said spreading means to effect spreading of said liners upon said engagement.

2. A gate valve construction including a body having a passage extending from end to end on a rectilinear axis and also having an opening at its top, a flexible and freely compressible diaphragm extending over said top opening and having a peripheral flange portion resting on the exterior of the body around said opening, securing means for said flange portion, a truncated pyramidal wedge-shaped gate portion carried by said diaphragm and movable through said opening, said gate portion having a hollow portion relatively wide at its upper end and relatively narrow at its lower end and integral with the diaphragm and of the same character, said hollow portion opening to the upper side of said diaphragm said gate portion further having rigid internal liners pressing against the inclined sides of said hollow portion, a rigid wedge interposed between said liners and operable for spreading the liners upon movement toward the narrow end of the gate portion.

3. A gate valve construction including a body having a passage extending from end to end on a rectilinear axis and also having an opening at its top, a flexible and freely compressible diaphragm extending over said top opening and having a peripheral flange portion resting on the exterior of the body around said opening, a cap for securing said flange portion to the said exterior of the body, a truncated pyramidal wedge-shaped gate portion carried by said diaphragm and movable through said opening, said gate portion having a hollow portion relatively wide at its upper end and relatively narrow at its lower end and integral with the diaphragm and of the same character, said hollow portion opening to the upper side of said diaphragm said gate portion further having rigid internal liners pressing against the inclined sides of said hollow portion, a rigid wedge interposed between said liners and operable for spreading the liners upon movement toward the narrow end of the gate portion, said operating means including a threaded opening in said cap and a threaded spindle screwed through said opening and having swivel connection with said rigid wedge.

References Cited in the file of this patent

UNITED STATES PATENTS

| | | |
|---|---|---|
| 1,070,803 | Harkom | Aug. 18, 1913 |
| 2,173,529 | Beecher | Sept. 19, 1939 |
| 2,290,251 | Saunders | July 21, 1942 |
| 2,540,298 | Seng | Feb. 6, 1951 |
| 2,628,057 | Holderith | Feb. 10, 1953 |

FOREIGN PATENTS

| | | |
|---|---|---|
| 624,576 | Great Britain | June 13, 1949 |
| 657,324 | Great Britain | Sept. 19, 1951 |
| 171,578 | Austria | of 1951 |
| 858,792 | Germany | of 1952 |